United States Patent Office 2,962,404
Patented Nov. 29, 1960

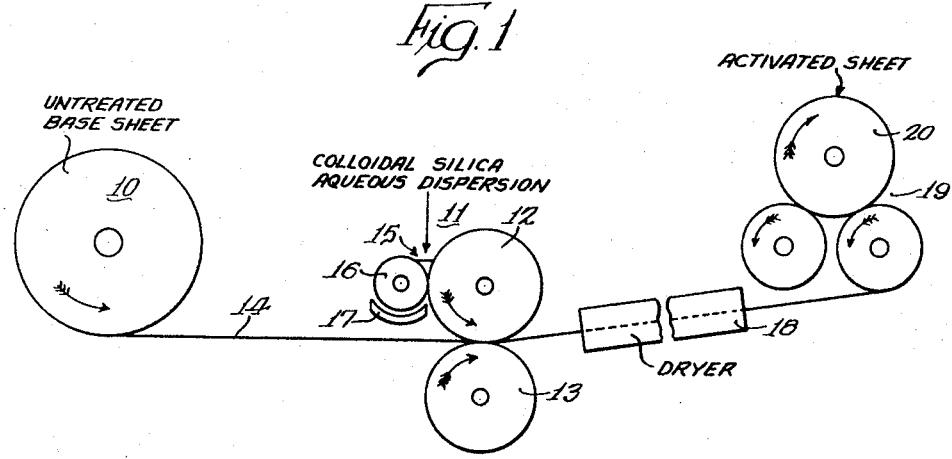
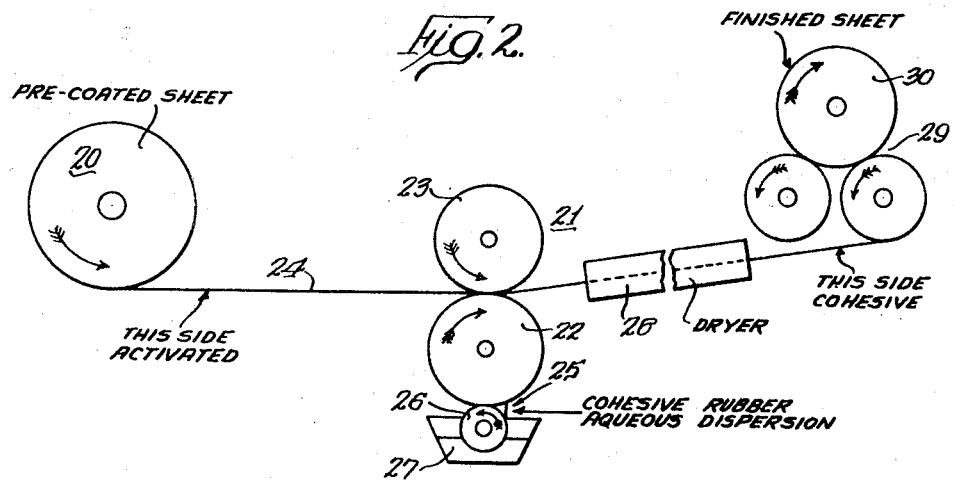

2,962,404

COHESIVE BONDS

James W. McIntyre, Appleton, Wis., and John F. Hechtman, Munising, Mich., assignors to Kimberly-Clark Corporation, Neenah, Wis., a corporation of Delaware Filed Apr. 24, 1956, Ser. No. 580,332

3 Claims. (Cl. 154—46)

Our invention has been found to be of particular value in connection with the production of cohesive bonds between two separate sheets, or two plies of a single sheet, the cohesive substance being so applied that the sheet or sheets may be interleaved or wound up into a package or packages without the necessity of including an additional sheet of parting material between contiguous plies or turns.

The term "cohesive" is used by us to describe a substance which when dry will adhere to itself, particularly when subjected to some pressure, but will not stick to most other materials even when subjected to considerable pressure. This characteristic is of extreme value in the case of sheet materials used for wrapping packages. It is of value not only in the initial wrapping of the package, for example in the factory, but it has great advantages for use in the home because the bonded plies may be pulled apart without tearing either ply sheet or damaging the coating on either ply. This permits a portion of the contents of the package to be removed and the package resealed in the same manner as was done in the initial wrapping of the package.

In general, the property of cohesion (ability to stick to itself) as distinguished from adhesion (ability to stick to many other materials) is possessed by rubber or rubber-like substances, for example the dry rubber film deposited from natural rubber latices. Generally, coatings of these substances are applied to the base-sheet in the form of an aqueous dispersion, and such application to the surface of the sheet does not involve any extraordinary problems when the surface of the base-sheet is somewhat porous, in which case the rubber coating may be able to anchor itself effectively to the base-sheet. However, when the base-sheet is virtually non-porous as in the case of glassine or cellophane, it is found that the cohesive rubber coating when applied is not adequately anchored to the surface of the sheet and separates from the sheet much too easily in subsequent use or handling.

Attempts have been made to blend or mix the cohesive substance with another ingredient or ingredients which might enable the cohesive coating to bond itself adequately to the non-porous sheet while not interfering too greatly with its normally cohesive properties. But this effort to compromise between the conflicting requirements of the coating in respect of the base-sheet and to itself, so far as we are advised, has not been commercially successful.

The invention, in its various aspects, is based upon the discovery that a suitable coating of an aqueous dispersion of colloidal silica which has been applied to the surface of a base sheet and then dried, activates the surface of the sheet by imparting to it certain valuable properties which have not been heretofore suspected or recognized. Among other properties the dry silica film on the sheet is found to be an excellent anchorage to which a suitable film of cohesive rubber or similar cohesive material may be subsequently applied and dried so as to form a sheet which has a cohesive side which cannot only be permanently pressure bonded to itself, but the plies of the bond so formed can later be separated manually without rupturing the base-sheet or damaging the cohesive film thereon.

Although this aspect of our discovery may have value in connection with some porous or semi-porous base-sheet materials, it is especially well adapted for use in the application of cohesive coatings to base-sheets of impervious or non-porous materials such as glassine, cellophane, cellulose acetate, polyethylene, polyesters such as nylon and Mylar [1], and other sheet materials which are sufficiently impermeable to prevent the silica dispersion from penetrating through the sheet.

Another phase of our invention is the discovery that a dry film of silica applied to a base-sheet so as to activate it in the manner previously described, although not cohesive to itself, will form an anchor for a dry film of cohesive rubber which has been applied to the surface of a separate complementary sheet. This property makes it possible to apply only the silica coating to one of the sheets and only the rubber coating to the other sheet, thereby effecting great savings in the use of coating materials. These economies may be also increased by printing the coating material upon one or both of the complementary sheets in separated areas or in patterns so as to still further reduce the amount of coating material required. Ordinarily it will be found convenient to apply to one of the sheets an all-over coating of the particular coating material which, at the time, is cheaper than that used on the complementary sheet.

In applying the silica film to a sheet to form an anchorage coating thereon, the consistency of the dispersion and the weights of film are not too critical. For example, in pre-coating a material such as glassine weighing between 5 and 15 pounds per thousand square feet, we can coat the surface with an aqueous dispersion of colloidal silica having a consistency of 3.5% to 40% of solids and in sufficient volume to increase the dry weight of the sheet by an amount of silica weighing from .04 to .60 pounds per thousand square feet.

Wetting agents may be added as desired to the colloidal silica dispersion to improve coverage and wetting of the base sheet. Suitable wetting agents are Aquarex SMO (a water solution of mono sodium salt of sulphated methyl oleate), Triton NE (alkyl aryl polyether alcohol) and Santomerse S (an alkyl aryl sulphonate salt). These are added in small amounts, for example .01 part (dry weight) of a solution of wetting agent per 100 parts (dry weight) of colloidal silica.

Roll application of controlled amounts of colloidal silica dispersion is aided by adjusting the viscosity of the dispersion. This may be done, for example, by the addition of thickening agents such as Superloid (sodium a'ginate) as required, a typical amount being 1.25 parts (dry weight) per 100 parts (dry weight) of colloidal silica dispersion.

After the silica dispersion is applied, the sheet is dried either by exposing it to air at normal atmospheric temperatures or by forced drying so as to form the anchorage sheet which is involved in both aspects of our invention.

If the above pretreated sheet is to be made into a cohesive product, it is then coated with cohesive material. To this end there is then applied to the activated pre-coated surface of the base-sheet, a coating of a dispersion of natural rubber or latex or the equivalent thereof in such volume and concentration as to increase the dry weight of the sheet to the extent of about .20 to 1.3 pounds of dry cohesive substance per 1000 square feet. The weight of cohesive substance is somewhat more critical than in

[1] DuPont trademark.

the case of the anchorage material as it should be at least sufficient to give a good permanent bond but small enough to give good clean cleavage between the two coatings if it is desired that the bond be re-established after separation.

The sheet is then redried, and finally wound up into a roll or piled in sheets. It can be taken off the roll or pile at any time without danger of the back of one sheet sticking to the cohesive face of the contiguous sheet, and the cohesive properties are maintained to the fullest extent.

Packages can be wrapped in the material and sealed by temporarily pressing together the cohesive faces of two plies of the sheet. The efficiency of the bond will continue for the normal useful life of the package. However, when the seal is pulled apart, the rubber coating remains on each of the plies and substantially none of it pulls off on the other ply. This shows that the strength of adherence of the silica coating to the base-sheet and to the cohesive coating of the base-sheet is in each case superior to the power of the dry cohesive faces to adhere to each other. This relationship has been very difficult to achieve with previously known methods, especially when using non-porous base sheets. The sheet can be stored in the roll or pile without loss of its desirable properties.

Where two complementary sheets are used, the silica is carried on the surface of one sheet, and only a cohesive rubber coating is carried on the outer surface of the other sheet. In such case either sheet may be porous or non-porous, it being understood that if the sheet carrying the cohesive rubber is glassine or other non-porous material, a silica coating is first applied to the sheet and dried before the cohesive rubber coating is applied.

In the drawings accompanying this application, we have shown, diagrammatically, apparatus which may be employed in practicing our improved methods and in making our improved products.

In these drawings:

Figs. 1 and 2 are schematic diagrams illustrating successive steps in making a product in accordance with the single sheet form of our invention.

In the drawings, referring to Fig. 1, 10 represents a roll of untreated base-sheet, for example, glassine. The numeral 11 represents as a whole the coating equipment which comprises an applicator roll 12 and a lower roll 13, forming a nip through which the base-sheet 14 is propelled. An aqueous dispersion of colloidal silica is fed to a metering nip 15 between the applicator roll 12 and the metering roll 16. After leaving the metering nip, the coating which passes through said nip is divided, a part being applied to the applicator roll 12 and a part being returned to the pool in the trough 17.

The concentration of the colloidal silica dispersion which is supplied to the coating equipment 17, and the pressure applied between the metering roll 16 and the applicator roll 12, are so adjusted as to supply the desired amount of colloidal silica to the surface of the sheet 14. After the sheet has passed through the applicator nip between rolls 12 and 13, it is conducted through a dryer 18 and then by means of the rewinder 19 it is wound into a roll 20. It will be observed that the pre-coated or activated surface of the sheet is on the outside of the roll 20.

In this form of our invention the activated surface of the sheet of the roll 20 is then coated with cohesive rubber by the coater 21 shown in Fig. 2. In this case, in view of the fact that the activated or pre-coated surface of the sheet is on the underside as it travels to the coating rolls, the applicator roll 22 is located below the complementary roll 23 which, with the applicator roll 22, forms the nip through which the activated sheet 24 is propelled. The aqueous rubber dispersion 25 is metered by a metering roll 26 which contacts the lower face of the applicator roll 22.

The cohesive rubber aqueous dispersion which is fed into the pool 27 is of such concentration and the metering pressure between rolls 26 and 22 is such that sufficient rubber is applied to the sheet to increase the dry weight of the sheet to the extent of about .20 to 1.3 pounds per 1000 square feet of sheet.

After the sheet has received its rubber coating, it is then conducted through a dryer 28 to remove excess moisture, and is then rolled up in a rewinding device 29 to form a completed roll 30 of finished material ready for immediate use. If the finished material is to be stored for future use, it is advisable to include a suitable anti-oxidant in the cohesive dispersion. In the case of a natural rubber dispersion, we can use any of the conventional anti-oxidants.

The term "cohesive rubber" as used herein means any natural rubber, rubber latex, or any of the synthetic latices or resins having the cohesive property of natural rubber.

The following are some specific examples showing the use of the invention in accordance with the single sheet form of the invention.

EXAMPLE I

*Cohesive coated glassine*

(This Example I also is typical of a formula which may be used on cellophane)

|  | Parts by Weight | Pounds/ 1,000 Square Feet |
|---|---|---|
| Glassine (Hydrated Cellulose) |  | 8.22 |
| Precoat Formulation (Dry Weight): |  |  |
| 31% solids— |  |  |
| Colloidal Silica | 100 |  |
| Sodium Alginate | 1.25 |  |
| Alkyl Aryl Polyether Alcohol | 0.01 |  |
| Precoat Weight |  | .24 |
| Natural Rubber Top Coat (Dry Weight): |  |  |
| 50% solids— |  |  |
| Natural Rubber | 100 |  |
| Antioxidant | 1.0 |  |
| Alkyl Aryl Polyether Alcohol | 0.75 |  |
| Ammonia (NH₃) | 0.125 |  |
| Coating Weight |  | .47 |
| Total Weight Base and Precoat and Top Coat |  | 8.93 |

EXAMPLE II

*Cohesive coated glassine*

|  | Parts by Weight | Pounds/ 1,000 Square Feet |
|---|---|---|
| Glassine (Hydrated Cellulose) |  | 8.22 |
| Precoat Formulation (Dry Weight): |  |  |
| 19% solids— |  |  |
| Colloidal Silica | 100 |  |
| Precoat Weight |  | .29 |
| (NOTE.—In this case, the silica dispersion was applied to the sheet in a size press as a part of the papermaking operation prior to super-calendering.) |  |  |
| Natural Rubber Top Coat (Dry Weight): |  |  |
| 50% solids— |  |  |
| Natural Rubber | 100 |  |
| Antioxidant | 1.0 |  |
| Alkyl Aryl Polyether Alcohol | 0.75 |  |
| Ammonia (NH₃) | 0.25 |  |
| Coating Weight |  | .47 |
| Total Weight Base and Precoat and Top Coat |  | 8.98 |

EXAMPLE III

Cohesive coated polyethylene

| | Parts by Weight | Pounds/ 1,000 Square Feet |
|---|---|---|
| Polyethylene | | 7.10 |
| Precoat Formulation (Dry Weight): | | |
| 31% solids— | | |
| Colloidal Silica | 100 | |
| Sodium Alginate | 1.25 | |
| Alkyl Aryl Polyether Alcohol | 0.01 | |
| Xylol Emulsion | 5.0 | |
| Precoat Weight | | .19 |
| Natural Rubber Top Coat (Dry Weight): | | |
| 50% solids— | | |
| Natural Rubber | 100 | |
| Antioxidant | 1.0 | |
| Alkyl Aryl Polyether Alcohol | 0.75 | |
| Ammonia (NH₃) | 0.25 | |
| Coating Weight | | .54 |
| Total Weight Base and Precoat and Top Coat | | 7.83 |

EXAMPLE IV

Cohesive coated polyester

| | Parts by Weight | Pounds/ 1,000 Square Feet |
|---|---|---|
| Polyethylene Terephthalate | | 7.15 |
| Precoat Formulation (Dry Weight): | | |
| 31% solids— | | |
| Colloidal Silica | 100 | |
| Sodium Alginate | 1.25 | |
| Alkyl Aryl Polyether Alcohol | 0.01 | |
| Water Sol. of Mono-Sodium Salt of Sulfated Methyl Oleate | 3.50 | |
| Precoat Weight | | 0.17 |
| Natural Rubber Top Coat (Dry Weight): | | |
| 50% solids— | | |
| Natural Rubber | 100 | |
| Antioxidant | 1.0 | |
| Alkyl Aryl Sulphonate Salt | .05 | |
| Ammonia (NH₃) | 0.25 | |
| Coating Weight | | 0.50 |
| Total Weight Base and Precoat and Top Coat | | 7.82 |

When using organic films as the base material, anchorage of the colloidal silica to the film may be improved by adding an emulsion of a suitable solvent to the dispersion of colloidal silica. Typical solvents which might be used are xylol, toluene or mineral spirits.

We will now refer to the second aspect of our invention involving the use of separate complementary sheets, one coated with silica and the other with rubber. It will be understood that the anchor sheet can be coated with silica by the process shown in Fig. 1 using the formulations set forth in the Examples I to IV, inclusive, whether the base sheet be glassine or other non-porous material, or whether it be a type of paper which is sufficiently non-absorptive to hold most of the silica dispersion on one side of the sheet, thus preventing complete penetration of the dispersion through the sheet to the other side thereof.

The cohesive rubber coating on the other complementary sheet may be applied by the process shown in Fig. 2, and the formulations set forth in Examples 1, 2 and 3, it being understood that the starting material in the roll 30, unless it be a glassine or similarly non-porous material, need not be precoated with silica. When the package is to be re-sealed, the weight of the rubber coating is preferably limited as in the case of the single sheet aspect of the invention.

For some uses it may be advantageous to adapt the complementary sheet principle to the opposite sides of a single sheet, so that one side of the sheet, coated with silica, may be cohesively attached to the other side which is coated with cohesive rubber. The problem of storing the sheet in a pile or roll may be solved by applying the complementary coatings in stripes or other patterns which are staggered or offset on the opposite sides of the sheet so that the complementary coated areas on contiguous sheets or plies will not register or overlap each other when in the pile or roll.

Certain features disclosed in this application are also disclosed and claimed in our pending application Serial No. 505,581 filed May 3, 1955, now U.S. Patent No. 2,803,560.

We claim:

1. In combination, a pair of complementary coated sheets of self-sustaining material, the coatings of which are selectively cohesive one to the other in their dry state, one sheet having a dry coating of colloidal silica effectively bonded to an area of one face thereof, the other sheet having a dry coating of cohesive rubber effectively bonded to an area of one face thereof, said coated areas being in tight contact whereby said sheets are cohesively attached to each other in the respective complementary coated areas by reason of such contact.

2. In combination, a pair of complementary coated sheets of self-sustaining material, the coatings of which are selectively cohesive one to the other in their dry state, one sheet having a dry coating of colloidal silica bonded to an area of one face thereof, the other sheet having a dry coating of cohesive rubber bonded to an area of one face thereof and weighing from 0.2 pound to 1.3 pounds per thousand square feet of coated area, said areas being in tight contact whereby said sheets are cohesively attached to each other in the respective complementary coated areas by reason of such contact.

3. The method of providing a selectively cohesive attachment between two complementary sheets of self-sustaining material which comprises coating an area of a face of one of said sheets with an aqueous dispersion of colloidal silica, then drying said coating to form a film of dry silica bonded to said area of the sheet, effectively coating an area of a face of the other sheet with an aqueous emulsion of cohesive rubber, drying the latter to form a dry film of cohesive rubber bonded to said area of the latter sheet, and then pressing a coated area of the silica coated sheet against a coated area of the rubber coated sheet.

References Cited in the file of this patent

UNITED STATES PATENTS

| | | |
|---|---|---|
| 1,960,137 | Brown | May 22, 1934 |
| 2,483,754 | Clifton | Oct. 4, 1949 |
| 2,555,745 | Hopkins et al. | June 5, 1951 |
| 2,561,362 | Guillot | July 24, 1951 |
| 2,607,711 | Hendricks | Aug. 19, 1952 |
| 2,803,560 | McIntyre et al. | Aug. 20, 1957 |
| 2,822,290 | Webber | Feb. 4, 1958 |
| 2,826,523 | Blaszkowski et al. | Mar. 11, 1958 |
| 2,829,073 | Williams | Apr. 1, 1958 |

FOREIGN PATENTS

| | | |
|---|---|---|
| 120,727 | Great Britain | Nov. 5, 1919 |